June 20, 1967   J. K. BARKER   3,326,597
TRAILER OR SIMILAR CONSTRUCTION
Filed Oct. 14, 1965
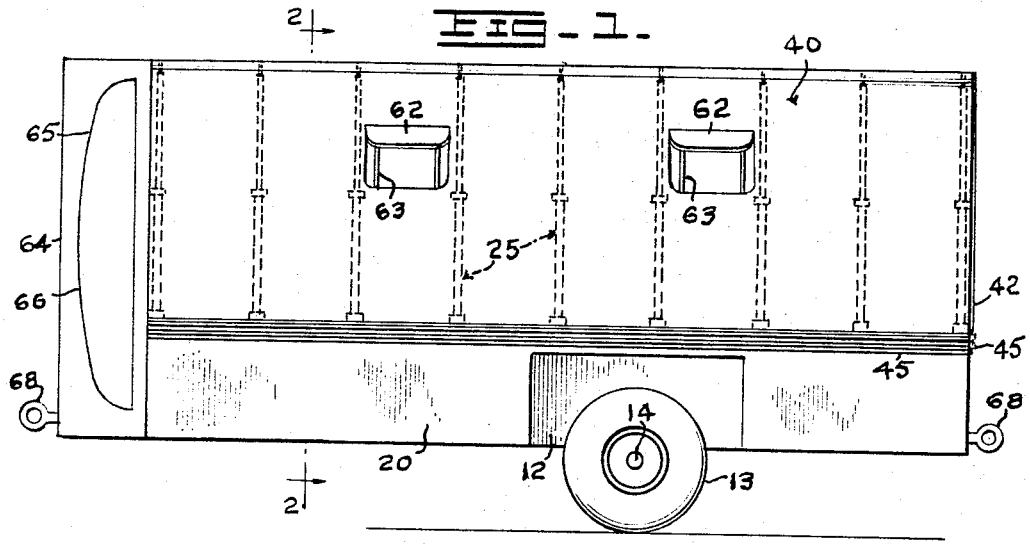
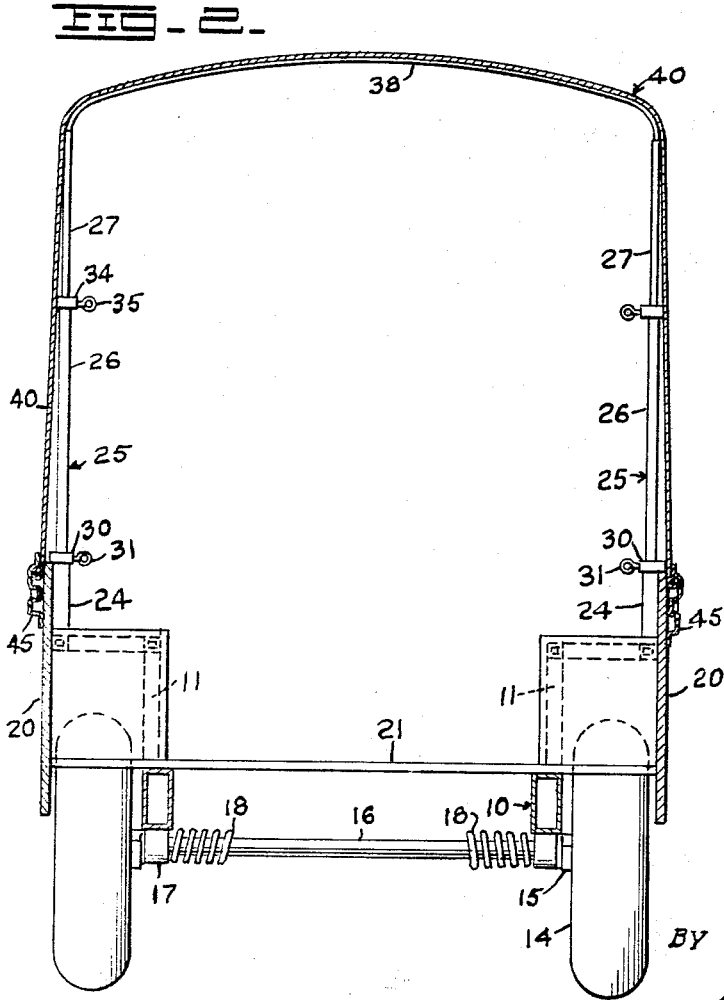
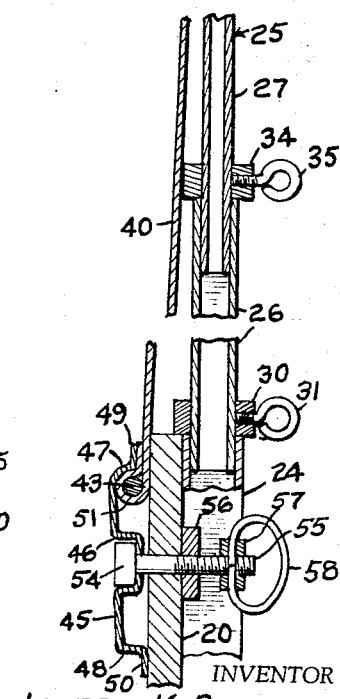
INVENTOR
JOSEPH K. BARKER
BY John V. Phillips
ATTORNEY

United States Patent Office 3,326,597
Patented June 20, 1967

3,326,597
TRAILER OR SIMILAR CONSTRUCTION
Joseph K. Barker, Rte. 2, Abingdon, Va. 24210
Filed Oct. 14, 1965, Ser. No. 495,969
8 Claims. (Cl. 296—100)

ABSTRACT OF THE DISCLOSURE

A trailer body wherein a flexible cover is supported by posts and bows spaced throughout the body of the trailer, the lower ends of the posts being supported against the inner faces of the trailer walls and the lower edges of the cover being clamped flat against the outer faces of the walls, the posts being adjustable to tension the cover.

---

This invention relates to trailers, and particularly to a type of trailer having a rigid lower body and a flexible covering thereover. It will become apparent, however, that the invention is not limited to trailers, but may be used, for example, on boats, as a tent construction, etc.

An important object of the invention is to provide, in combination with a lower trailer body, a flexible covering for the body forming a shelter therewithin, and to provide novel means for anchoring the lower edges of the flexible cover relative to the body.

A further object is to provide, in combination with the anchoring means for the lower edges of the flexible cover, supporting means for the cover extensible upwardly to tension the cover to prevent it from flapping and possibly tearing in heavy winds.

Other objects and advantages of the invention will become apparent during the following description.

In the drawing I have shown one embodiment of the invention. In this showing:

FIGURE 1 is a side elevation of the trailer;
FIGURE 2 is an enlarged section on line 2—2 of FIGURE 1; and
FIGURE 3 is an enlarged vertical fragmentary sectional view through one of the cover supporting post units and associated elements.

Referring to the drawings, the numeral 10 indicates as a whole a supporting frame for the trailer, forming no part of the present invention but disclosed and claimed in my copending application, Ser. No. 496,071, filed Oct. 14, 1965. The invention is shown as applied to a wheeled trailer and is constructed as at 11 to provide a well 12 (FIGURE 1) in which are mounted supporting wheels 13 preferably confined within the transverse limits of the trailer to assist in achieving compactness. The wheel axles 14 are connected to crank arms 15 (FIGURE 2) carried by the ends of a cross shaft 16 journaled as at 17 to the main frame of the vehicle. Torsion springs 18 surround the shaft 16 and have respective ends connected to the shaft 16 and to the frame, thus providing a resilient mounting for the wheels.

To opposite sides of the frame are mounted side body panels 20. In accordance with the showing in the copending application referred to, the panels 20 lie against vertical and horizontal frame members (not shown) to which the panels are rigidly secured. A floor 21 is provided within the trailer body and is supported by the frame thereof.

In accordance with the showing in the copending application referred to, the frame of the vehicle supports a plurality of open topped socket members 24 adapted to form parts of the frame, and each of the socket members 24 is polygonal in cross section, and preferably square.

Each socket member 24 forms a support for a vertical support unit, each of which is indicated as a whole by the numeral 25 and each of which includes intermediate and upper post elements 26 and 27. Each intermediate post element 26 has its lower ends slidable in one of the sockets 24 (FIGURE 3), while each upper post element 27 has its lower end similarly slidable in the upper end of the associated intermediate element 26. Each of the intermediate and upper post elements is preferably square in cross section.

A collar 30 surrounds each post element 26 and normally seats on the upper end of the associated socket 24, and is adapted to be maintained in vertically adjusted position by a wing nut 31, clamping against the support unit 26 when the wing nut is tightened.

A similar collar 34 surrounds each post element 25 and normally seats on the upper end of the associated element 26. Each collar 34 is also maintained in position by a wing nut 35.

The post units 25 are preferably uniformly shaped from end to end of the trailer as shown in dotted lines in FIGURE 1. Each post unit is arranged opposite a post unit at the opposite side of the vehicle, and the upper ends of the post elements 27 receive the lower ends of roof bows 38. The lower ends of these bows are straight to slip into the upper post elements 27 and are limited in their downward movement by the curvatures at the ends of the bows adjacent the upper ends of the post elements 27.

The post units 25 and roofs bows 38 support a flexible cover indicated as a whole by the numeral 40. This cover may be made of any suitable material of sufficient strength, including flexible plastic or rubber sheets, canvas, or the like. In practice, it is preferred that the cover be made of inner and outer canvas layers with an interpositioned layer of insulating material. The specific material of the cover is immaterial so far as the present invention is concerned.

The lower edges of the sides of the cover 40, and the lower edge of the rear side of the cover, generally designated by the numeral 42 in FIGURE 1, are beaded by being wrapped around a rope, cable, or the like 43, as shown in FIGURE 3. Since the opposite sides and the back wall or flap of the cover are identically so formed, it is unnecessary to specifically illustrate the back cover.

Along each opposite side of the trailer and the rear end thereof is arranged a clamping plate 45 shown in detail in FIGURE 3. This plate includes a central, longitudinal groove 46, inturned flanges 47 and 48 at the top and bottom thereof, and extended substantially vertical flanges 49 and 50, the latter of which is seated against the body panel 20. The plate 45 forms with the flange 47 a space adapted to receive the bead 51 of the adjacent bottom edge of the cover 40.

At spaced points along each side of the trailer and along the back thereof, each groove 46 is adapted to receive the head 54 of a bolt 55, the threaded shank of which extends through a plate 56 fixed against rotation by the adjacent side wall of the vehicle. The inner end of each bolt carries a nut 57 and this nut and the shank of the bolt are drilled to receive the split ends of a ring 58 by means of which the bolt may be rotated, thus tightening the plate 45 in position as shown in FIGURE 3.

The sides of the cover 40 may be provided with any suitable type of windows, such as flaps 62 in FIGURE 1, having suitable stiffening means (not shown) and adapted to be proped open as at 63. The forward end of the vehicle is preferably provided with a triangular entrance way 64 in the form of a vestibule having an opening 65 adapted to be closed by a flap 66. The vestibule and its entrance way form no part of the present invention. Opposite ends of the trailer are provided with hitches 68 so that the forward end of the trailer may be connected to a towing vehicle and that two or more of the trailers may be hitched together to form a train.

*Operation*

The trailer is normally used with the parts in the positions shown. By loosening the bolts 55 the beads 51 may be released from their clamping plates and rolled up or tossed over the top of the trailer to open the sides thereof. When it is desired to close the sides and back, the upper wing nuts 35 or lower wing nuts 31 may be loosened, thus permitting the roof bows 38 and post elements 27 to move downwardly. With the plates 45 loosened, the beads 51 are placed inside the upper ends of the clamping plates 54, whereupon the bolts 55 are tightened. The post elements previously lowered may be raised by hand to tension the sides and back of the top, whereupon the wing nuts 31 and 35 are tightened. Thus the cover 40 will be tensioned, and in practice it has been found that the manual operation of tensioning the top is so effective that the top is prevented from flapping and possibly becoming torn in heavy winds. Moreover, the roof bows 38 may be lowered by loosening the wing nuts 35 where it is desired to lower the top of the trailer for greater vertical clearance when necessary. The specific means for lowering the top to its limit is a feature in my copending application referred to and has been described therein. In practice, the vertical corners of the body are provided with water-proof slide fasteners, now available on the market. These fasteners form no part of the present invention and have not been illustrated.

The trailer has great versatility in many different uses. It can be fitted out with living quarters and provides maximum lightness and may be transported over a road. It also has extensive use in the military forces and can be readily carried from place to place by a helicopter. Fitted out as a medical unit, it may be lowered near a field of battle with a doctor and medical aides to assist the wounded. It also can be fitted out as a military command post.

While the invention has been specifically described in connection with a wheeled trailer, it will be noted that it is equally applicable to boats to form a shelter therefor. In fact, the sides of the trailer could be sides of a tent-like construction supported on the ground or on a platform with the cover arranged thereover and connected in the manner shown.

It is to be understood that the form of the invention shown and described is to be taken as a preferred example of the same, and that various changes may be made as do not depart from the scope of the appended claims.

What is claimed is:

1. In combination, a pair of spaced oppositely arranged vertical walls elongated horizontally, cover supporting means having lower ends fixed with respect to said walls inwardly thereof and projecting upwardly therefrom, a flexible cover arranged over said supporting means and projecting downwardly outwardly of the respective walls, and releasable means for clamping the lower edges of said cover continuously substantially throughout the length of and to and flat against said walls, said cover supporting means having extensible elements for tensioning said cover when the lower edges thereof are clamped by said clamping means.

2. In combination, a pair of spaced oppositely arranged vertical walls elongated horizontally, cover supporting means having lower ends fixed with respect to said walls inwardly thereof and projecting upwardly therefrom, a flexible cover arranged over said supporting means and projecting downwardly outwardly of the respective walls, and releasable means for clamping the lower edges of said cover continuously substantially throughout the length of and to and flat against said walls, said cover supporting means comprising a plurality of posts each made up of relatively vertically slidable sections to be moved vertically to tension said cover when the lower edges thereof are engaged by said clamping means.

3. In combination, a pair of vertically spaced oppositely arranged horizontaly elongated walls, cover supporting means having lower ends normally fixed relative to and arranged inwardly of said walls, said supporting means comprising a plurality of oppositely arranged post units and a supporting bow connected between the upper ends thereof, each post unit being made up of telescoping sections and having section clamping means for clamping said sections relative to each other, a flexible cover extending over said supporting means and projecting downwardly outwardly of the respective walls, and cover clamping means arranged outwardly of the respective walls and carried thereby and releasably engageable with the lower edges of said cover to clamp it substantially throughout its length against said walls, said section clamping means being releasable for movement of the upper sections upwardly to tension said cover when said cover clamping means is operative.

4. The combination set forth in claim 3 provided with a plurality of vertical open topped sockets arranged inwardly of and fixed with respect to said walls to telescopically receive the next higher section of each post unit.

5. A trailer comprising a frame having oppositely arranged spaced horizontally elongated side walls, spaced vertical open topped sockets arranged against the inner face of each wall, each socket being arranged opposite a socket at the opposite side of the trailer, a vertical lower post section vertically slidable in each socket and having an open upper end, an upper post section slidable in the upper end of each lower section, supporting bows connected between the upper ends of the upper post sections, a plurality of adjusting devices carried by each post section for limiting downward movement of the upper post sections relative to the lower post sections and for limiting movement of the lower post sections relative to said sockets, a cover extending across said bows and downwardly outwardly of said post sections and outwardly of said walls, cover clamping means carried by each wall outwardly thereof and releasably clampable against the lower edges of said cover continuously substantially throughout the length thereof, said adjusting devices being releasable whereby the top of said cover over said bows is movable upwardly to tension said cover when the lower edges thereof are clamped by said cover clamping means.

6. A trailer according to claim 5 wherein said adjusting devices comprise rings surrounding said upper post sections and engageable with the upper ends of said lower post sections and rings carried by said lower post sections and engageable with the upper ends of said sockets, each ring being provided with a clamping screw.

7. A trailer according to claim 5 wherein each cover clamping device comprises a horizontal plate extending longitudinally along the outer face of each wall and provided adjacent its upper edge with a flange extending inwardly toward the associated wall, each lower edge of said cover having a bead adapted to be arranged beneath said flange and against the adjacent side wall to be clamped relative thereto.

8. A trailer according to claim 7 wherein each plate is recessed in its outer face, bolts having heads received wholly within said recess and projecting through said walls.

References Cited

UNITED STATES PATENTS

| | | | |
|---|---|---|---|
| 450,158 | 4/1891 | James | 296—104 |
| 487,544 | 12/1892 | Simon. | |
| 1,100,310 | 6/1914 | Lazarus | 135—3 |
| 1,263,759 | 4/1918 | Hanaway | 296—105 |
| 2,120,018 | 6/1938 | Cone. | |
| 2,126,307 | 8/1938 | Boedeker. | |
| 2,406,737 | 9/1946 | Bramble | 296—105 |
| 2,565,746 | 8/1951 | Turner | 296—104 |
| 2,733,492 | 2/1956 | Copell. | |
| 2,911,254 | 11/1959 | Schumacher | 296—100 |

FOREIGN PATENTS

| | | |
|---|---|---|
| 853,280 | 11/1960 | Great Britain. |

BENJAMIN HERSH, *Primary Examiner.*

C. C. PARSONS, *Assistant Examiner.*